(12) United States Patent
Hirao et al.

(10) Patent No.: US 12,728,688 B2
(45) Date of Patent: Sep. 8, 2026

(54) SENSOR ABNORMALITY DETECTION DEVICE

(71) Applicant: Hitachi Astemo, Ltd., Ibaraki (JP)

(72) Inventors: Ryusuke Hirao, Ibaraki (JP); Masatoshi Yamahata, Ibaraki (JP); Shu Kato, Ibaraki (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 4 days.

(21) Appl. No.: 19/107,335

(22) PCT Filed: Nov. 29, 2023

(86) PCT No.: PCT/JP2023/042695
§ 371 (c)(1),
(2) Date: Feb. 27, 2025

(87) PCT Pub. No.: WO2024/127990
PCT Pub. Date: Jun. 20, 2024

(65) Prior Publication Data

US 2026/0070389 A1 Mar. 12, 2026

(30) Foreign Application Priority Data

Dec. 14, 2022 (JP) ................................ 2022-199480

(51) Int. Cl.
*B60G 17/0185* (2006.01)

(52) U.S. Cl.
CPC .... *B60G 17/0185* (2013.01); *B60G 2400/204* (2013.01)

(58) Field of Classification Search
CPC ................................................. B60G 17/0185
See application file for complete search history.

(56) References Cited

U.S. PATENT DOCUMENTS 10,650,620 B2 * 5/2020 Saylor .................. G07C 5/0816
2007/0129865 A1 * 6/2007 Kim .................. B60G 17/0185 701/37

(Continued)

FOREIGN PATENT DOCUMENTS

JP 4-87819 3/1992
JP 4-252776 9/1992

(Continued)

OTHER PUBLICATIONS

International Search Report issued Feb. 13, 2024 in International Application No. PCT/JP2023/042695, with English translation.

(Continued)

*Primary Examiner* — Ramsey Refai
(74) *Attorney, Agent, or Firm* — Wenderoth, Lind & Ponack, L.L.P.

(57) ABSTRACT

A CAN input unit (traveling speed input unit) to which a traveling speed of a vehicle is to be input and sprung acceleration input units (a first sensor input unit and a second sensor input unit) to which signal fluctuation ranges (vibration levels) of sprung acceleration sensors are to be input are included. An ECU includes a first determination unit which determines whether a traveling speed provided by the CAN input unit is equal to or more than a first threshold value, and a signal fluctuation range of one of a sprung acceleration sensor value of the sprung acceleration input unit serving as the first sensor input unit and a sprung acceleration sensor value of the sprung acceleration input unit serving as the second sensor input unit is smaller than a first fluctuation range and smaller than a signal fluctuation range of another of the first and second sensor input values.

3 Claims, 9 Drawing Sheets

(56) References Cited

U.S. PATENT DOCUMENTS

| | | | | |
|---|---|---|---|---|
| 2008/0306649 | A1* | 12/2008 | Im | B60G 17/015 701/29.5 |
| 2019/0080531 | A1* | 3/2019 | Saylor | B60G 21/005 |
| 2022/0305869 | A1* | 9/2022 | Ohno | B60G 17/0157 |
| 2025/0042214 | A1* | 2/2025 | Kim | B60G 17/0185 |
| 2025/0074131 | A1* | 3/2025 | Rutkowski | B60G 17/01908 |

FOREIGN PATENT DOCUMENTS

| | | |
|---|---|---|
| JP | 9-113535 | 5/1997 |
| JP | 2000-206144 | 7/2000 |
| JP | 2002-534699 | 10/2002 |

OTHER PUBLICATIONS

Written Opinion of the International Searching Authority issued Feb. 13, 2024 in International Application No. PCT/JP2023/042695, with English translation.

Office Action issued Sep. 24, 2025 in corresponding Japanese Patent Application No. 2024-564264 with English translation.

* cited by examiner

SENSOR ABNORMALITY DETECTION DEVICE

TECHNICAL FIELD

The present disclosure relates to a sensor abnormality detection device for detecting abnormality of a sensor.

BACKGROUND ART

In Patent Literature 1, there is disclosed a configuration for detecting, with respect to an active suspension including a lateral acceleration sensor, abnormality of the lateral acceleration sensor. With this configuration, abnormality that is disconnection or short circuit is detected by looking at an output value of the lateral acceleration sensor itself. That is, the lateral acceleration sensor is determined to have abnormality when the output value of the lateral acceleration sensor is outside a normal range. As for drifting of a sensor signal or sticking of the sensor signal to an intermediate value, a lateral acceleration is obtained based on the output value of the lateral acceleration sensor and, when a state in which this lateral acceleration has a magnitude of 0.1 G or more lasts for 10 seconds, the lateral acceleration sensor is determined to have abnormality.

CITATION LIST

Patent Literature

PTL 1: JP H4-87819 A

SUMMARY OF INVENTION

Technical Problem

With the abnormality detection method as disclosed in Patent Literature 1, in a case in which turning in a steady circular turn or traveling banked continues, for example, a lateral acceleration equal to or more than a certain value is continuously detected, and abnormality of the lateral acceleration sensor may accordingly be detected erroneously. In addition, in a case in which this abnormality detection method is applied to a vertical acceleration sensor, there is similarly a possibility of erroneous detection of sensor abnormality when traveling on a sloped road or a banked road continues.

One object of the present invention is to provide a sensor abnormality detection device capable of detecting abnormality of a sensor with erroneous detection reduced.

Solution To Problem

According to one embodiment of the present invention, there is provided a sensor abnormality detection device for detecting abnormality of at least two sensors provided in a vehicle, the abnormality detection device including: a traveling speed input unit to which a traveling speed of the vehicle is to be input; a first sensor input unit to which a signal fluctuation range of a first sensor is to be input; a second sensor input unit to which a signal fluctuation range of a second sensor is to be input; and a first determination unit configured to determine whether the traveling speed provided by the traveling speed input unit is equal to or more than a first speed, and a signal fluctuation range of one of a first sensor input value of the first sensor input unit and a second sensor input value of the second sensor input unit is smaller than a first fluctuation range and smaller than a signal fluctuation range of another of the first sensor input value and the second sensor input value.

According to the one embodiment of the present invention, it is possible to detect abnormality of the sensor with erroneous detection reduced.

DESCRIPTION OF EMBODIMENTS

With reference to the accompanying drawings, a detailed description is now given of a sensor abnormality detection device according to each embodiment of the present invention while taking as an example a case in which this sensor abnormality detection device is applied to, for example, a four-wheeled vehicle.

Figure 1:
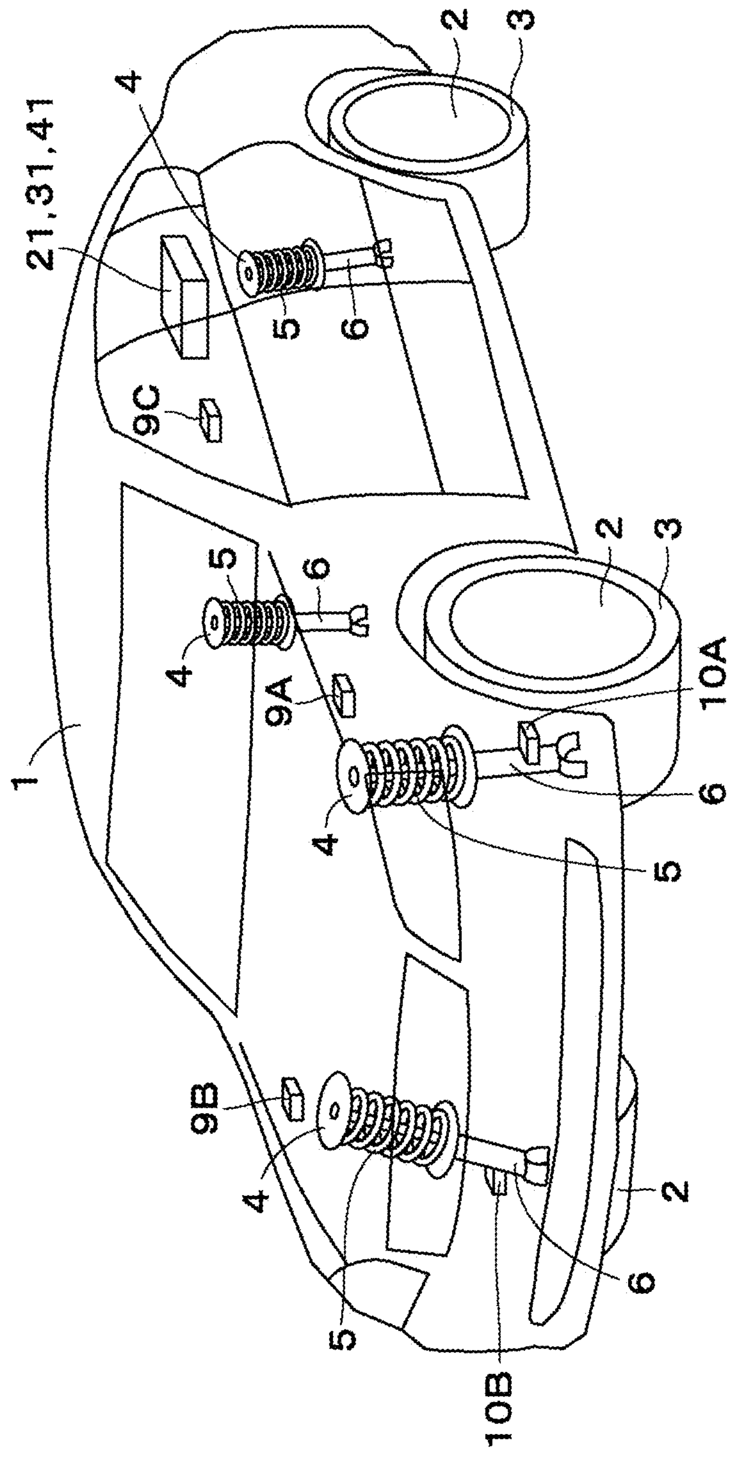
FIG. 1 is an overall configuration diagram for illustrating a four-wheeled vehicle to which an ECU according to an embodiment of the present invention is applied.
Figure 2:
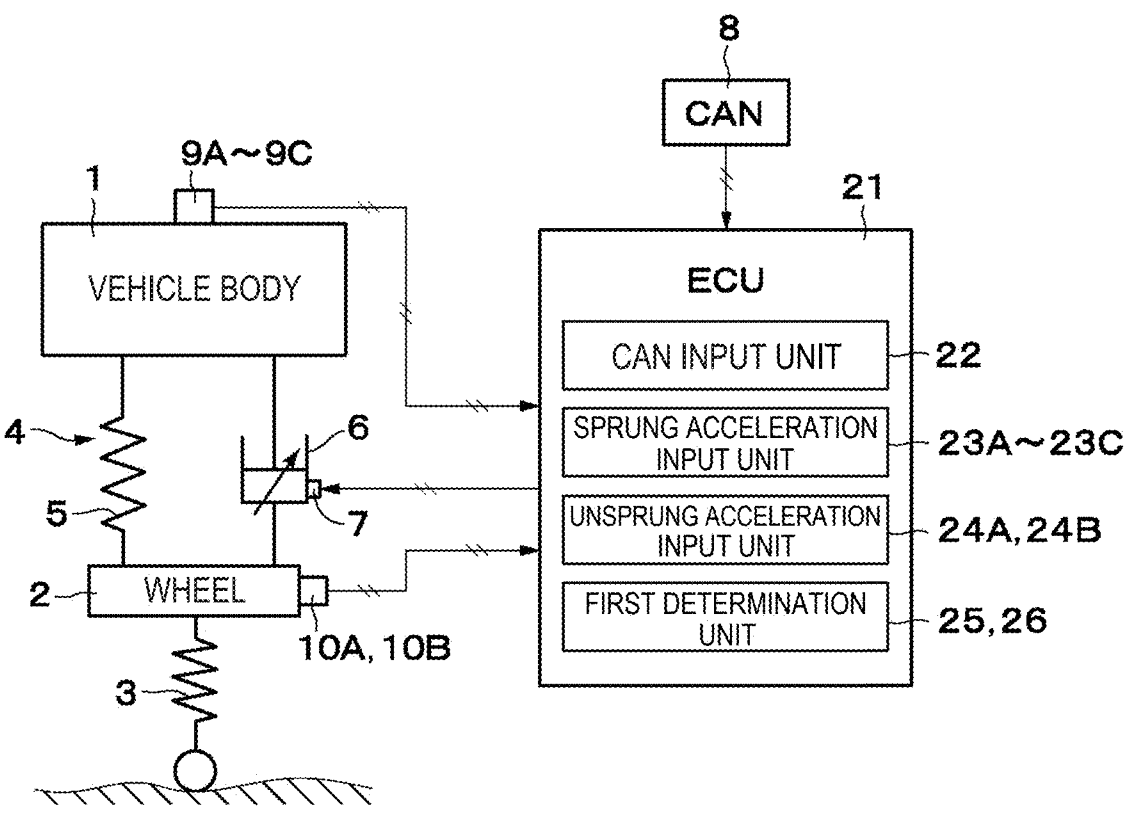
FIG. 2 is a diagram for schematically illustrating an ECU and a shock absorber in a first embodiment of the present invention.
Figure 3:
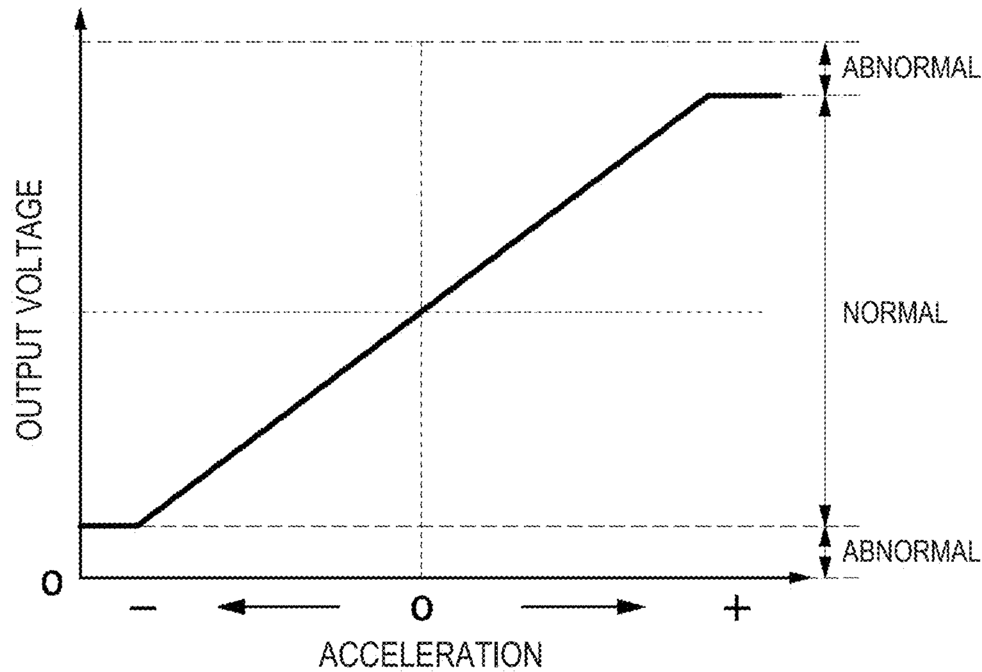
FIG. 3 is a characteristic chart for showing a relationship between an output voltage and acceleration of a sprung acceleration sensor and an unsprung acceleration sensor.

FIG. 1 to FIG. 4 show a first embodiment of the present invention. In FIG. 1 and FIG. 2, a vehicle body 1 forms a body of a vehicle. On a lower side of the vehicle body 1, there are provided, for example, right and left front wheels and right and left rear wheels (hereinafter collectively referred to as "wheel 2"). Those wheels 2 each include a tire 3. This tire 3 acts as a spring for absorbing fine roughness of a road surface. The vehicle body 1 and the wheels 2 form the vehicle.

A suspension device 4 is provided in such a manner as to be interposed between the vehicle body 1 and the wheel 2. The suspension device 4 includes a suspension spring 5 (hereinafter referred to as "spring 5") and a damping-force adjustment-type shock absorber 6 (hereinafter referred to as "variable damper 6") arranged in a parallel relationship with the spring 5 and provided in such a manner as to be interposed between the vehicle body 1 and the wheel 2.

The variable damper 6 of the suspension device 4 is provided between the vehicle body 1 of the vehicle and each wheel 2 out of the four wheels. The variable damper 6 is an actuator for varying a force that suppresses relative displacement between the vehicle body 1 and the wheel 2. The variable damper 6 varies a force generated between the vehicle body 1 and the wheel 2. The variable damper 6 is also a force generating mechanism that adjusts a force between the vehicle body 1 of the vehicle and the wheel 2. A force generated by the variable damper 6 is adjustable between soft and hard.

The variable damper 6 is configured with use of a hydraulic shock absorber of a damping-force adjustment type. As illustrated in FIG. 2, a damping-force variable actuator 7 formed of, for example, a damping-force adjustment valve is provided to the variable damper 6 in order to continuously adjust a characteristic of a generated damping force (that is, a damping-force characteristic) from a hard characteristic to a soft characteristic. The damping-force variable actuator 7 is a damping-force adjusting unit for adjusting a damping force in accordance with a supplied current (drive current).

It is not always required that the damping-force variable actuator 7 continuously adjust the damping-force characteristic. The damping-force variable actuator 7 may be capable of adjusting a damping force in a plurality of stages, for example, two or more stages. Further, the variable damper 6 may be of a pressure control type or a flow-rate control type.

A controller area network (CAN) 8 is a serial communication unit installed in the vehicle body 1. The CAN 8 executes in-vehicle multiplex communication between a large number of pieces of electronic equipment and an ECU 21 which are installed in the vehicle. The CAN 8 transmits vehicle driving information via a CAN signal including a serial signal. In this case, the vehicle driving information transmitted through the CAN 8 includes, for example, a yaw rate, a steering angle, a vehicle speed, a forward acceleration, a backward acceleration, a brake fluid pressure, and an engine torque.

Three sprung acceleration sensors 9A to 9C are provided in the vehicle body 1 and. on the vehicle body I which is a sprung side, each detect a vibration acceleration in a vertical direction. The sprung acceleration sensors 9A to 9C form sprung state detection means for detecting a sprung vibration.

In this case, the sprung acceleration sensor 9A is attached to the vehicle body 1 at a position that is, for example, in the vicinity of an upper end side of the variable damper 6 on a left front wheel side. The sprung acceleration sensor 9B is attached to the vehicle body 1 at a position that is, for example, in the vicinity of an upper end side of the variable damper 6 on a right front wheel side. The sprung acceleration sensor 9C is attached to the vehicle body 1 at an intermediate position between the right and left rear wheels. The sprung acceleration sensors 9A to 9C each detect the vibration acceleration in the vertical direction on the vehicle body 1 side which is the sprung side, and output a resultant detection signal to the ECU 21. The detection signal of each of the sprung acceleration sensors 9A to 9C is, for example, an output voltage shown in FIG. 3. The output voltage varies in accordance with the acceleration. Specifically, the output voltage takes an intermediate value when the acceleration is zero, takes an ever smaller value as the acceleration increases on a negative side (for example, a lower side), and takes an ever larger value as the acceleration increases on a positive side (for example, an upper side). A voltage value within a normal range is set in advance to the detection signal (output voltage) of each of the sprung acceleration sensors 9A to 9C. The normal range in this case includes the output voltage observed when the acceleration is zero.

Two unsprung acceleration sensors 10A and 10B are provided on the wheel 2 side of the vehicle. Specifically, the unsprung acceleration sensor 10A is provided at, for example, the front wheel on the left side of the vehicle. The unsprung acceleration sensor 10B is provided at, for example, the front wheel on the right side of the vehicle. The unsprung acceleration sensors 10A and 10B each detect a vibration acceleration in the vertical direction on the wheel 2 side which is an unsprung side, and output a resultant detection signal to the ECU 21. The detection signal of each of the unsprung acceleration sensors 10A and 10B is, for example, the output voltage shown in FIG. 3. This output voltage is substantially the same as the detection signal of each of the sprung acceleration sensors 9A to 9C. A voltage value within a normal range is set in advance to the detection signal (output voltage) of each of the unsprung acceleration sensors 10A and 10B. The normal range in this case includes the output voltage observed when the acceleration is zero.

The ECU 21 forms a vehicle control device for controlling the suspension device 4. The ECU 21 controls the variable damper 6 which varies the force generated between the vehicle body 1 and the wheel 2, The ECU 21 here is control means for controlling the generated force of the variable damper 6 (the force generating mechanism).

The ECU 21 includes a processor (not shown) serving as a control unit. The processor is formed of a microcomputer or the like. The ECU 21 includes a storage unit (not shown) including a ROM, a RAM, a non-volatile memory, or the like. The processor executes a program stored in the storage unit, to thereby control the damping force of the variable damper 6.

As illustrated in FIG. 2, an input side of the ECU 21 is connected to the CAN 8, the sprung acceleration sensors 9A to 9C, the unsprung acceleration sensors 10A and 10B, and others, and an output side of the ECU 21 is connected to the damping-force variable actuator 7 of the variable damper 6 and others.

The ECU 21 includes a CAN input unit 22 to which the CAN signal is to be input from the CAN 8. The CAN signal in this case includes the vehicle driving information. Further, the vehicle driving information includes the vehicle speed. The CAN input unit 22 is accordingly a traveling speed input unit to which a traveling speed of the vehicle (vehicle speed) is to be input.

The ECU 21 includes sprung acceleration input units 23A to 23C to which the detection signals from the sprung acceleration sensors 9A to 9C are to be input. In this case, one of the sprung acceleration sensors 9A to 9C (for example, the sprung acceleration sensor 9A) serves as a first sensor. One of the remaining sprung acceleration sensors (for example, the sprung acceleration sensor 9B) serves as a second sensor. Accordingly, the sprung acceleration input unit (for example, the sprung acceleration input unit 23A) associated with the first sensor is a first sensor input unit to which a signal fluctuation range of the first sensor is to be input. The sprung acceleration input unit (for example, the sprung acceleration input unit 23B) associated with the second sensor is a second sensor input unit to which a signal fluctuation range of the second sensor is to be input.

The sprung acceleration sensor 9B may serve as the first sensor and the sprung acceleration sensor 9C may serve as the first sensor. Similarly, the sprung acceleration sensor 9A may serve as the second sensor and the sprung acceleration sensor 9C may serve as the second sensor.

The ECU 21 includes unsprung acceleration input units 24A and 24B to which the detection signals from the unsprung acceleration sensors 10A and 10B are to be input. In this case, one of the unsprung acceleration sensors 10A and 10B (for example, the unsprung acceleration sensor 10A) serves as a first sensor. Another of the unsprung acceleration sensors (for example, the unsprung acceleration sensor 10B) serves as a second sensor. Accordingly, the unsprung acceleration input unit (for example, the unsprung acceleration input unit 24A) associated with the first sensor is the first sensor input unit to which the signal fluctuation range of the first sensor is to be input. The unsprung acceleration input unit (for example, the unsprung acceleration input unit 24B) associated with the second sensor is the second sensor input unit to which the signal fluctuation range of the second sensor is to be input.

The unsprung acceleration sensor 10B may serve as the first sensor. Similarly, the unsprung acceleration sensor 10A may serve as the second sensor.

The ECU 21 reads the vehicle driving information from the CAN 8 via serial communication. The ECU 21 reads a sprung acceleration sensor value (sprung acceleration) via the detection signal from each of the sprung acceleration sensors 9A to 9C. The ECU 21 reads an unsprung acceleration sensor value (unsprung acceleration) via the detection signal from each of the unsprung acceleration sensors 10A and 10B. The ECU 21 calculates a target damping force and others based on the vehicle driving information, the sprung acceleration, and the unsprung acceleration. The ECU 21 outputs a control command based on the target damping force to the variable damper 6 to control the generated force (damping force) of the variable damper 6.

The ECU 21 forms a sensor abnormality detection device for detecting abnormality of the sprung acceleration sensors 9A to 9C and the unsprung acceleration sensors 10A and 10B. The ECU 21 detects abnormality of the sprung acceleration sensors 9A to 9C and the unsprung acceleration sensors 10A and 10B by executing a program stored in the storage unit. The ECU 21 acquires the vehicle speed included in the vehicle driving information from the CAN 8. The ECU 21 acquires, based on three detection signals from the sprung acceleration sensors 9A to 9C, sprung acceleration sensor values (sprung acceleration) of the respective sensors. The ECU 21 acquires, based on two detection signals from the unsprung acceleration sensors 10A and 10B, unsprung acceleration sensor values (unsprung acceleration) of the respective sensors.

The ECU 21 acquires a vibration level of the sprung acceleration sensor value of each of the sprung acceleration sensors 9A to 9C based on, for example, a maximum peak value and a minimum peak value (peak-to-peak value) of the sprung acceleration sensor value. The ECU 21 acquires a vibration level of the unsprung acceleration sensor value of each of the unsprung acceleration sensors 10A and 10B based on, for example, a maximum peak value and a minimum peak value (peak-to-peak value) of the unsprung acceleration sensor value.

On the condition that the vehicle speed exceeds a first threshold value V11, which is a first speed, the ECU 21 compares the vibration levels of any two sprung acceleration sensor values out of the three sprung acceleration sensor values. The ECU 21 includes a first determination unit 25 which determines, when, for example, the vibration level of the sprung acceleration sensor value of the sprung acceleration sensor 9A is less than a first fluctuation range R11 and is lower than the vibration level of the sprung acceleration sensor value of the sprung acceleration sensor 9B, that the sprung acceleration sensor 9A is in an abnormal state and has a sprung acceleration sensor value that is stuck.

In this case, the vehicle speed is included among conditions for determining sensor abnormality in order to prevent a vibration input that is input to the vehicle when the vehicle is stopped from causing erroneous determination. That is, the first determination unit 25 uses vibration of a sprung acceleration sensor value during traveling to detect abnormality of the sprung acceleration sensor value. The first threshold value V11 is accordingly a speed at which the vibration level of a sprung acceleration sensor value is well discernible. The first threshold value V11 is set to a value within a range of, for example, from 20 km/h to 40 km/h. Specifically, the first threshold value V11 is set to an appropriate value equal to or more than 20 km/h by taking characteristics of the sprung acceleration sensors 9A to 9C, characteristics of circuits that output the detection signals, and the like into consideration.

The first fluctuation range R11 is set to a value that is, for example, larger than a vibration level at which the sprung acceleration sensor value is stuck and smaller than the vibration level of the sprung acceleration sensor value in a normal state. Specifically, the first fluctuation range R11 is set to a value that is approximately twice to three times larger than the vibration level at which the sprung acceleration sensor value is stuck. The first fluctuation range R11 is suitably set by taking the characteristics of the sprung acceleration sensors 9A to 9C, a signal level of a noise, and the like into consideration.

Similarly, on the condition that the vehicle speed exceeds a first threshold value V12, which is a first speed, the ECU 21 compares the vibration levels of two unsprung acceleration sensor values. The ECU 21 includes a first determination unit 26 which determines, when, for example, the vibration level of the unsprung acceleration sensor value of the unsprung acceleration sensor 10A is less than a first fluctuation range R12 and is lower than the vibration level of the unsprung acceleration sensor value of the unsprung acceleration sensor 10B, that the unsprung acceleration sensor 10A is stuck.

In this case, the first threshold value V12 is a speed at which the vibration level of an unsprung acceleration sensor value is well discernible. The first threshold value V12 is set to a value appropriate for circuits that output the detection signals and others in addition to the unsprung acceleration sensors 10A and 10B. The first threshold value V12 may be the same value as the first threshold value V11 or may be a value different from the first threshold value V11.

The first fluctuation range R12 is set to a value that is, for example, larger than a vibration level at which the unsprung acceleration sensor value is stuck and smaller than the vibration level of the unsprung acceleration sensor value in a normal state. Specifically, the first fluctuation range R 12 is set to a value that is approximately twice to three times larger than the vibration level at which the unsprung acceleration sensor value is stuck. The first fluctuation range R12 is suitably set by taking the characteristics of the unsprung acceleration sensors 10A and 10B, a signal level of a noise, and the like into consideration. The first fluctuation range R12 may be the same value as the first fluctuation range R11 or may be a value different from the first fluctuation range R11.

Sensor abnormality detection processing by the ECU 21 is now described with reference to FIG. 2.

The ECU 21 reads out a program stored in the storage unit to execute the sensor abnormality detection processing. The description given here takes the first determination unit 25 which detects abnormality of the sprung acceleration sensors 9A to 9C as an example, but the description applies also to the first determination unit 26 which detects abnormality of the unsprung acceleration sensors 10A and 10B.

The ECU 21 receives the CAN signal from the CAN 8 and reads three detection signals of the sprung acceleration sensors 9A to 9C as well. The ECU 21 acquires the vehicle speed included in the vehicle driving information from the CAN signal. The ECU 21 acquires three sprung acceleration sensor values (sprung acceleration) based on the three detection signals of the sprung acceleration sensors 9A to 9C.

The ECU 21 determines whether the sprung acceleration sensor values (output voltage values) are values within the normal range. When every one of the three sprung acceleration sensor values is within the normal range, the ECU 21 executes processing of the first determination unit 25. In a case in which at least one sprung acceleration sensor value is outside the normal range, on the other hand, the ECU 21 executes sensor abnormality processing. In the sensor abnormality processing, it is determined that, for example, there is abnormality in the sprung acceleration sensor (for example, the sprung acceleration sensor 9A) that has output the sprung acceleration sensor value outside the normal range, and a count of an abnormality detection counter is incremented. When the count of the abnormality detection counter reaches a predetermined value, the ECU 21 outputs an error signal and notifies that there is abnormality in the sprung acceleration sensor of interest.

The first determination unit 25 determines whether the vehicle speed exceeds the first threshold value V11. When the vehicle speed is less than the first threshold value V11, there is a possibility that the vibration level of the sprung acceleration sensor value is not high enough, and the first determination unit 25 cannot detect abnormality based on the vibration level. Accordingly, when the vehicle speed is less than the first threshold value V11, the first determination unit 25 returns the processing without executing determination of the vibration level of the sprung acceleration sensor value.

When the vehicle speed is equal to or more than the first threshold value V11, on the other hand, the first determination unit 25 determines whether the vibration level of the sprung acceleration sensor value is normal. Specifically, the first determination unit 25 selects any two sprung acceleration sensor values out of the three sprung acceleration sensor values. The first determination unit 25 compares one of the two sprung acceleration sensor values and another of the two sprung acceleration sensor values to each other. The ECU 21 executes this comparison processing for all sprung acceleration sensor values.

In this case, the first determination unit 25 determines whether the fluctuation range (vibration level) of one of the two sprung acceleration sensor values is smaller than the first fluctuation range R11 and smaller than the fluctuation range (vibration level) of another of the two sprung acceleration sensor values.

When the fluctuation range (vibration level) of one of the two sprung acceleration sensor values is smaller than the first fluctuation range R11 and smaller than the fluctuation range (vibration level) of another of the two sprung acceleration sensor values, the sprung acceleration sensor (for example, the sprung acceleration sensor 9A) corresponding to the one sprung acceleration sensor value is considered to have abnormality. Consequently, the first determination unit 25 executes the sensor abnormality processing described above.

When the fluctuation range (vibration level) of one of the two sprung acceleration sensor values is larger than the first fluctuation range R11, or when one of the two sprung acceleration sensor values is larger than another of the two sprung acceleration sensor values in fluctuation range (vibration level), on the other hand, abnormality of the one of the two sprung acceleration sensor values is undetectable. Accordingly, in order to detect abnormality of the remaining sprung acceleration sensor value, the same comparison processing is executed for the remaining sprung acceleration sensor value as well. When no abnormality is detected in any of the sprung acceleration sensor values, the first determination unit 25 determines that the vibration level of every sprung acceleration sensor value is normal, and returns the processing.

The ECU 21 according to the first embodiment has the configuration described above. Next, the sensor abnormality detection by the ECU 21 is described with reference to FIG. 4 by taking, as an example, operation executed when abnormality of one of the sprung acceleration sensors is detected.

Figure 4:
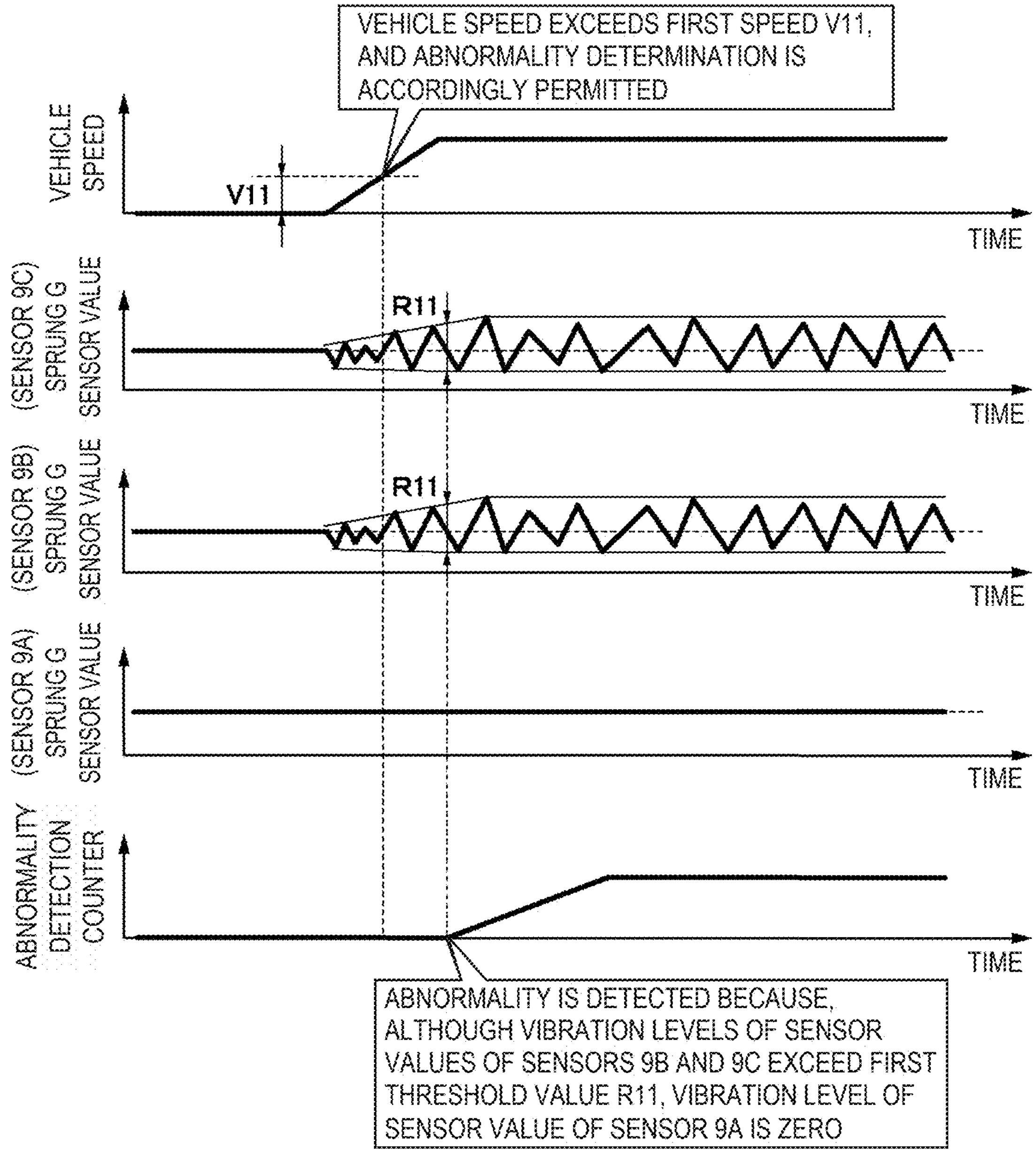
FIG. 4 is a characteristic chart for showing an example of temporal changes in vehicle speed, sprung acceleration sensor value, and count of an abnormality detection counter in a case in which a vehicle speed exceeds a first threshold value.

As shown in FIG. 4, when the vehicle speed exceeds the first threshold value V11, the ECU 21 determines whether the vibration levels of the sprung acceleration sensor values are within the normal range. In this case, the vibration levels of the sprung acceleration sensor values of the sprung acceleration sensors 9B and 9C increase as the vehicle speed rises, and eventually exceed the first fluctuation range R11. The sprung acceleration sensors 9B and 9C which output those two sprung acceleration sensor values are accordingly considered to be normal. The vibration level of the sprung acceleration sensor value of the sprung acceleration sensor 9A, on the other hand, is less than the first fluctuation range R11. In addition, the vibration level of the sprung acceleration sensor value of the sprung acceleration sensor 9A is a value smaller than any of the vibration levels of the sprung acceleration sensor values of the sprung acceleration sensors 9B and 9C. The sprung acceleration sensor 9A which outputs this sprung acceleration sensor value is accordingly considered to have abnormality. Then the ECU 21 increments the count of the abnormality detection counter. When the count of the abnormality detection counter reaches a predetermined value, the ECU 21 outputs an error signal and notifies that there is abnormality in the sprung acceleration sensor 9A.

Thus, the ECU 21 according to the first embodiment includes the CAN input unit 22 (the traveling speed input unit) to which the traveling speed of the vehicle is to be input and the sprung acceleration input units 23A to 23C (the first sensor input unit and the second sensor input unit) to which signal fluctuation ranges (vibration levels) of the sprung acceleration sensors 9A to 9C are to be input. The ECU 21 includes the first determination unit 25 which determines whether the traveling speed (vehicle speed) provided by the CAN input unit 22 is equal to or more than the first threshold value V11 (the first speed), and the signal fluctuation range of one of the sprung acceleration sensor value (a first sensor input value) of the sprung acceleration input unit (for example, the sprung acceleration input unit 23A) serving as the first sensor input unit and the sprung acceleration sensor value (a second sensor input value) of the sprung acceleration input unit (for example, the sprung acceleration input unit 23B) serving as the second sensor input unit is smaller than the first fluctuation range R11 and smaller than the signal fluctuation range of another of the first sensor input value and the second sensor input value.

Accordingly, even when, for example, a sprung acceleration sensor value is stuck within the normal range, abnormality of the sprung acceleration sensor value is detectable by comparison of vibration levels (signal fluctuation ranges) among a plurality of sprung acceleration sensor values.

The ECU 21 also includes the first determination unit 26 which determines whether the traveling speed (vehicle speed) provided by the CAN input unit 22 is equal to or more than the first threshold value V12 (the first speed), and the signal fluctuation range of one of the unsprung acceleration sensor value (the first sensor input value) of the unsprung acceleration input unit 24A serving as the first sensor input unit and the unsprung acceleration sensor value (the second sensor input value) of the unsprung acceleration input unit 24B serving as the second sensor input unit is smaller than the first fluctuation range R12 and smaller than the signal fluctuation range of another of the first sensor input value and the second sensor input value.

Accordingly, even when, for example, an unsprung acceleration sensor value is stuck within the normal range, abnormality of the unsprung acceleration sensor value is detectable by comparison of vibration levels (signal fluctuation ranges) among a plurality of unsprung acceleration sensor values.

Figure 5:
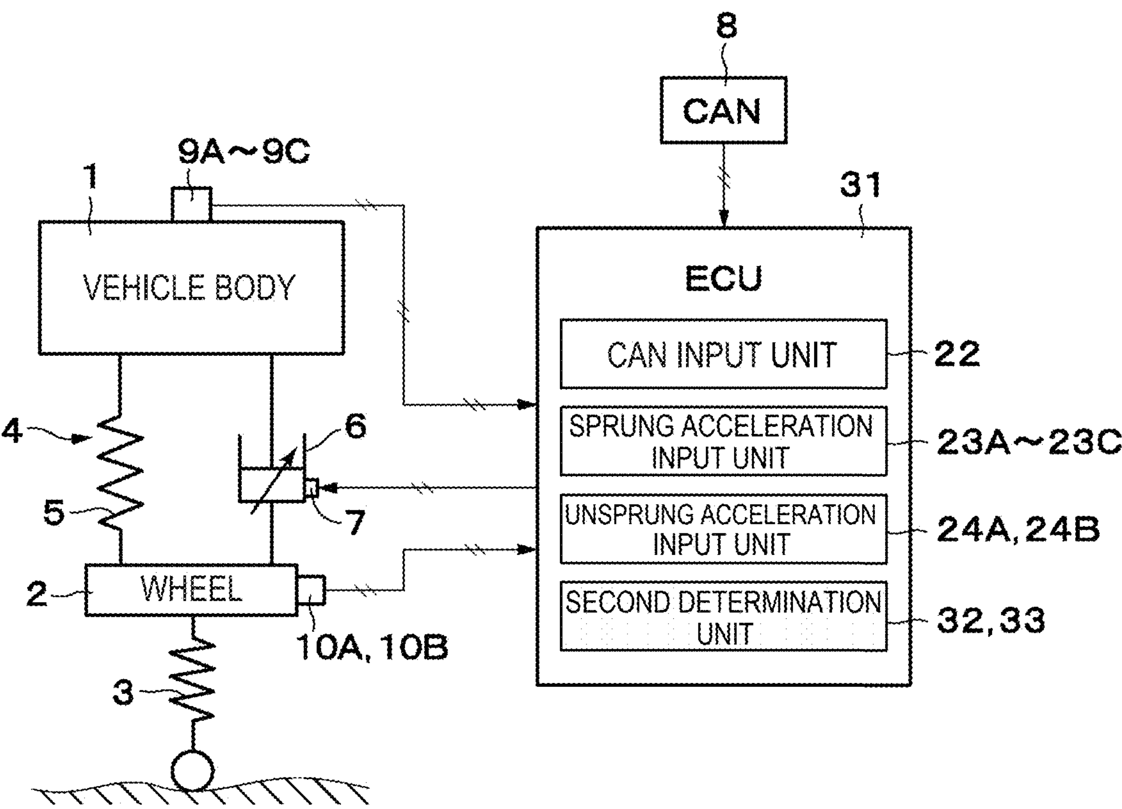
FIG. 5 is a diagram for schematically illustrating an ECU and a shock absorber in a second embodiment of the present invention.
Figure 6:
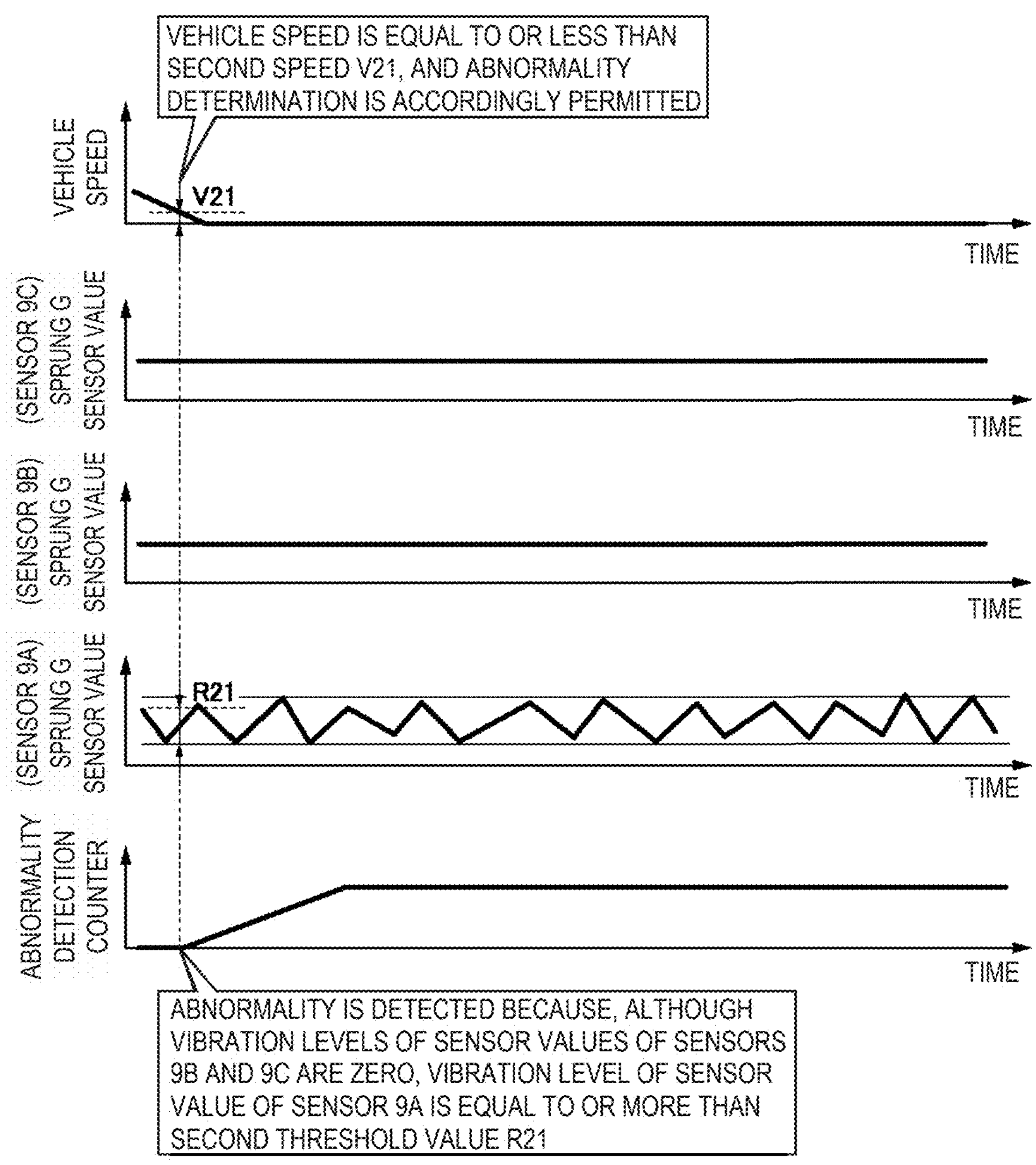
FIG. 6 is a characteristic chart for showing an example of temporal changes in vehicle speed, sprung acceleration sensor value, and count of the abnormality detection counter in a case in which the vehicle speed is lower than a second threshold value.
Figure 7:
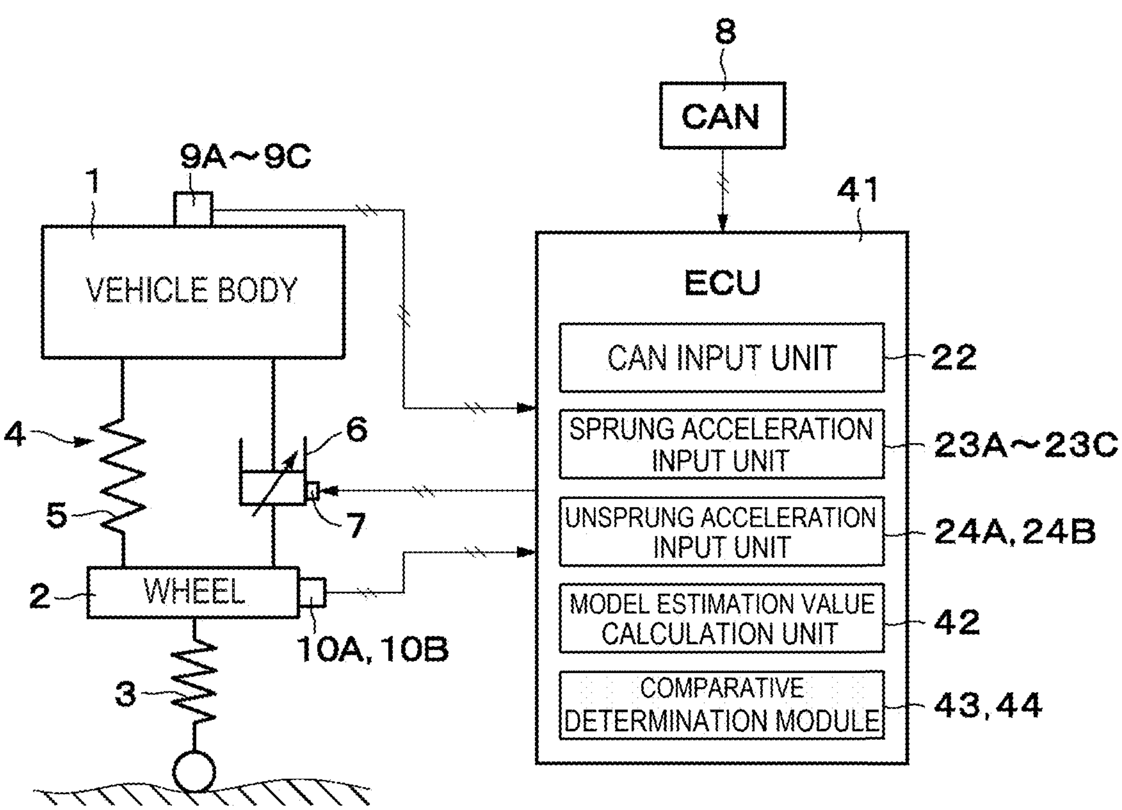
FIG. 7 is a diagram for schematically illustrating an ECU and a shock absorber in a third embodiment of the present invention.

Next, a second embodiment of the present invention is illustrated in FIG. 1, FIG. 5, and FIG. 6. A feature of the second embodiment is that an ECU includes a second determination unit which determines whether the traveling speed is equal to or less than a second speed, and the signal fluctuation range of one of the first sensor input value and the second sensor input value is larger than a second fluctuation range and larger than the signal fluctuation range of another of the first sensor input value and the second sensor input value. In the second embodiment, components that are the same as the components of the first embodiment described above are denoted by the same reference symbols, and descriptions thereof are omitted.

An input side of an ECU 31 according to the second embodiment is connected to the CAN 8, the sprung acceleration sensors 9A to 9C, the unsprung acceleration sensors 10A and 10B, and others, and an output side of the ECU 31 is connected to the damping-force variable actuator 7 of the variable damper 6 and others. The ECU 31 is configured the same way as the ECU 21 according to the first embodiment. The ECU 31 includes a processor serving as a control unit and a storage unit including a ROM, a RAM, a non-volatile memory, and the like (none are shown). The processor executes a program stored in the storage unit, to thereby control the damping force of the variable damper 6.

The ECU 31 reads the vehicle driving information from the CAN 8 via serial communication. The ECU 31 reads a sprung acceleration sensor value (sprung acceleration) via the detection signal from each of the sprung acceleration sensors 9A to 9C. The ECU 31 reads an unsprung acceleration sensor value (unsprung acceleration) via the detection signal from each of the unsprung acceleration sensors 10A and 10B. The ECU 31 calculates a target damping force and others based on the vehicle driving information, the sprung acceleration, and the unsprung acceleration. The ECU 31 outputs a control command based on the target damping force to the variable damper 6 to control the generated force (damping force) of the variable damper 6.

The ECU 31 forms a sensor abnormality detection device for detecting abnormality of the sprung acceleration sensors 9A to 9C and the unsprung acceleration sensors 10A and 10B. Similarly to the ECU 21 according to the first embodiment, the ECU 31 includes the CAN input unit 22, the sprung acceleration input units 23A to 23C, and the unsprung acceleration input units 24A and 24B.

The ECU 31 executes a program stored in the storage unit, to thereby detect abnormality of the sprung acceleration sensors 9A to 9C and the unsprung acceleration sensors 10A and 10B. The ECU 31 acquires the vehicle speed included in the vehicle driving information from the CAN 8. The ECU 31 acquires, based on three detection signals from the sprung acceleration sensors 9A to 9C, sprung acceleration sensor values (sprung acceleration) of the respective sensors. The ECU 31 acquires, based on two detection signals from the unsprung acceleration sensors 10A and 10B, unsprung acceleration sensor values (unsprung acceleration) of the respective sensors.

On the condition that the vehicle speed is lower than a second threshold value V21, which is a second speed, the ECU 31 compares the vibration levels of any two sprung acceleration sensor values out of the three sprung acceleration sensor values. The ECU 31 includes a second determination unit 32 which determines, when, for example, the vibration level of the sprung acceleration sensor value of the sprung acceleration sensor 9A exceeds a second fluctuation range R21 and exceeds the vibration level of the sprung acceleration sensor value of the sprung acceleration sensor 9B, that the sprung acceleration sensor 9A is in an abnormal state and has a sprung acceleration sensor value that is vibrating abnormally.

In this case, the vehicle speed is included among conditions for determining sensor abnormality because, since the sensors detect vibrations due to road surface inputs during traveling, whether vibration of the sensor value is due to road surface inputs or due to abnormal sensor vibration cannot be discerned. That is, the second determination unit 32 uses vibration of a sprung acceleration sensor value in a state in which the vehicle is stopped or a state close thereto to detect abnormality of the sprung acceleration sensor value. The second threshold value V21 is accordingly a speed at which the vehicle is stopped and the vibration level of a sprung acceleration sensor value is sufficiently small. The second threshold value V21 is set to a value within a range of, for example, from 0.5 km/h to 1 km/h. Specifically, the second threshold value V21 is set to a value appropriate for resolution of wheel speed sensors determined by, for example, the characteristics of the sprung acceleration sensors 9A to 9C and the circuits that output the detection signals.

The second fluctuation range R21 is set to a value that is, for example, larger than the vibration level of a normal sprung acceleration sensor value during stopping and smaller than the vibration level of an abnormal sprung acceleration sensor value. Specifically, the second fluctuation range R21 is set to a value that is approximately twice to three times larger than the vibration level of a normal sprung acceleration sensor value during stopping. The second fluctuation range R21 is suitably set by taking the characteristics of the sprung acceleration sensors 9A to 9C, the signal level of a noise, and the like into consideration.

Similarly, on the condition that the vehicle speed is lower than a second threshold value V22, which is a second speed, the ECU 31 compares the vibration levels of two sprung acceleration sensor values. The ECU 31 includes a second determination unit 33 which determines, when, for example, the vibration level of the unsprung acceleration sensor value of the unsprung acceleration sensor 10A exceeds a second fluctuation range R22 and exceeds the vibration level of the unsprung acceleration sensor value of the unsprung acceleration sensor 10B, that the unsprung acceleration sensor 10A is in an abnormal state and has an unsprung acceleration sensor value that is vibrating abnormally.

In this case, the second threshold value V22 is a speed at which the vehicle is stopped and the vibration level of a sprung acceleration sensor value is sufficiently small. The second threshold value V22 is set to a value appropriate for the resolution of the wheel speed sensors determined by, for example, the characteristics of the unsprung acceleration sensors 10A and 10B and the circuits that output the detection signals. The second threshold value V22 may be the same value as the second threshold value V21 or may be a value different from the second threshold value V21.

The second fluctuation range R22 is set to a value that is, for example, larger than the vibration level of a normal unsprung acceleration sensor value during stopping and smaller than the vibration level of an unsprung acceleration sensor value in an abnormal state. Specifically, the second fluctuation range R22 is suitably set by taking the characteristics of the unsprung acceleration sensors 10A and 10B, a signal level of a noise, and the like into consideration. The second fluctuation range R22 may be the same value as the second fluctuation range R21 or may be a value different from the second fluctuation range R21.

Sensor abnormality detection processing by the ECU 31 is now described with reference to FIG. 5.

The ECU 31 reads a program stored in the storage unit to execute the sensor abnormality detection processing. The description given here takes the second determination unit 32 which detects abnormality of the sprung acceleration sensors 9A to 9C as an example, but the description applies also to the second determination unit 33 which detects abnormality of the unsprung acceleration sensors 10A and 10B.

The ECU 31 receives the CAN signal from the CAN 8 and reads three detection signals of the sprung acceleration sensors 9A to 9C as well. The ECU 31 acquires the vehicle speed included in the vehicle driving information from the CAN signal. The ECU 31 acquires three sprung acceleration sensor values (sprung acceleration) based on the three detection signals of the sprung acceleration sensors 9A to 9C.

The ECU 31 determines whether the sprung acceleration sensor values (output voltage values) are values within the normal range. When every one of the three sprung acceleration sensor values is within the normal range, the ECU 31 executes processing of the second determination unit 32. In a case in which at least one sprung acceleration sensor value is outside the normal range, on the other hand, the ECU 31 executes sensor abnormality processing. In the sensor abnormality processing, it is determined that, for example, there is abnormality in the sprung acceleration sensor (for example, the sprung acceleration sensor 9A) that has output the sprung acceleration sensor value outside the normal range, and a count of an abnormality detection counter is incremented. When the count of the abnormality detection counter reaches a predetermined value, the ECU 31 outputs an error signal and notifies that there is abnormality in the sprung acceleration sensor of interest.

The second determination unit 32 determines whether the vehicle speed is lower than the second threshold value V21. When the vehicle speed is higher (larger) than the second threshold value V21, there is a possibility that vibrations due to road surface inputs during traveling are detected by the sensors, and the second determination unit 32 cannot detect abnormality based on the vibration level. Accordingly, when the vehicle speed is higher than the second threshold value V21, the second determination unit 32 returns the processing without executing determination of the vibration level of the sprung acceleration sensor value.

When the vehicle speed is equal to or less than the second threshold value V21, on the other hand, the second determination unit 32 determines whether the vibration level of the sprung acceleration sensor value is normal. Specifically, the second determination unit 32 selects any two sprung acceleration sensor values out of the three sprung acceleration sensor values. The second determination unit 32 compares one of the two sprung acceleration sensor values and another of the two sprung acceleration sensor values to each other. The second determination unit 32 executes this comparison processing for all sprung acceleration sensor values.

In this case, the second determination unit 32 determines whether the fluctuation range (vibration level) of one of the two sprung acceleration sensor values is larger than the second fluctuation range R21 and larger than the fluctuation range (vibration level) of another of the two sprung acceleration sensor values.

When the fluctuation range (vibration level) of one of the two sprung acceleration sensor values is larger than the second fluctuation range R21 and larger than the fluctuation range (vibration level) of another of the two sprung acceleration sensor values, the sprung acceleration sensor (for example, the sprung acceleration sensor 9A) corresponding to the one sprung acceleration sensor value is considered to have abnormality. Consequently, the second determination unit 32 executes the sensor abnormality processing described above.

When the fluctuation range (vibration level) of one of the two sprung acceleration sensor values is smaller than the second fluctuation range R21, or when one of the two sprung acceleration sensor values is smaller than another of the two sprung acceleration sensor values in fluctuation range (vibration level), on the other hand, abnormality of the one of the two sprung acceleration sensor values is undetectable. Accordingly, in order to detect abnormality of the remaining sprung acceleration sensor value, the same comparison processing is executed for the remaining sprung acceleration sensor value as well. When no abnormality is detected in any of the sprung acceleration sensor values, the second determination unit 32 determines that the vibration level of every sprung acceleration sensor value is normal, and returns the processing.

The ECU 31 according to the second embodiment has the configuration described above. Next, the sensor abnormality detection by the ECU 31 is described with reference to FIG. 6 by taking, as an example, operation executed when abnormality of one of the sprung acceleration sensors is detected.

As shown in FIG. 6, when the vehicle speed is lower than the second threshold value V21, the ECU 31 determines whether the vibration levels of the sprung acceleration sensor values are within the normal range. In this case, the vibration levels of the sprung acceleration sensor values of the sprung acceleration sensors 9B and 9C are close to zero, and are smaller than the second fluctuation range R21. The sprung acceleration sensors 9B and 9C which output those two sprung acceleration sensor values are accordingly considered to be normal. The vibration level of the sprung acceleration sensor value of the sprung acceleration sensor 9A, on the other hand, is larger than the second fluctuation range R21. In addition, the vibration level of the sprung acceleration sensor value of the sprung acceleration sensor 9A is a value larger than any of the vibration levels of the sprung acceleration sensor values of the sprung acceleration sensors 9B and 9C. The sprung acceleration sensor 9A which outputs this sprung acceleration sensor value is accordingly considered to have abnormality. Then the ECU 31 determines that there is abnormality in the sprung acceleration sensor 9A, and increments the count of the abnormality detection counter, When the count of the abnormality detection counter reaches a predetermined value, the ECU 31 outputs an error signal and notifies that there is abnormality in the sprung acceleration sensor 9A.

In this manner, the same actions and effects as those of the first embodiment can be obtained in the thus configured second embodiment as well. The ECU 31 according to the second embodiment includes the second determination unit 32 which determines whether the traveling speed (vehicle speed) provided by the CAN input unit 22 is equal to or less than the second threshold value V21 (the second speed), and the signal fluctuation range of one of the sprung acceleration sensor value (a first sensor input value) of the sprung acceleration input unit (for example, the sprung acceleration input unit 23A) serving as the first sensor input unit and the sprung acceleration sensor value (a second sensor input value) of the sprung acceleration input unit (for example, the sprung acceleration input unit 23B) serving as the second sensor input unit is larger than the second fluctuation range R21 and larger than the signal fluctuation range of another of the first sensor input value and the second sensor input value.

Accordingly, even when, for example, a sprung acceleration sensor value abnormally vibrates within the normal range under a state in which the vehicle is stopped, abnormality of the sprung acceleration sensor value is detectable by comparison of vibration levels (signal fluctuation ranges) among a plurality of sprung acceleration sensor values.

The ECU 31 also includes the second determination unit 33 which determines whether the traveling speed (vehicle speed) provided by the CAN input unit 22 is equal to or less than the second threshold value V22 (the second speed), and the signal fluctuation range of one of the unsprung acceleration sensor value (the first sensor input value) of the unsprung acceleration input unit (for example, the unsprung acceleration input unit 24A) serving as the first sensor input unit and the unsprung acceleration sensor value (the second sensor input value) of the unsprung acceleration input unit (for example, the unsprung acceleration input unit 24B) serving as the second sensor input unit is larger than the second fluctuation range R22 and larger than the signal fluctuation range of another of the first sensor input value and the second sensor input value.

Accordingly, even when, for example, an unsprung acceleration sensor value abnormally vibrates within the normal range under a state in which the vehicle is stopped, abnormality of the unsprung acceleration sensor value is detectable by comparison of vibration levels (signal fluctuation ranges) among a plurality of unsprung acceleration sensor values.

The second embodiment may be combined with the first embodiment. That is, the ECU 31 may include, in addition to the second determination units 32 and 33, the first determination units 25 and 26 in the first embodiment.

Next, a third embodiment of the present invention is illustrated in FIG. 1 and FIG. 7 to FIG. 9. A feature of the third embodiment is that an ECU includes a model estimation value calculation unit which estimates vehicle behavior from vehicle model information to obtain a vehicle behavior estimation value, and a comparative determination unit which compares the vehicle behavior estimation value to the first sensor input value or the second sensor input value. In the third embodiment, components that are the same as the components of the first embodiment described above are denoted by the same reference symbols, and descriptions thereof are omitted.

An input side of an ECU 41 according to the third embodiment is connected to the CAN 8, the sprung acceleration sensors 9A to 9C, the unsprung acceleration sensors 10A and 10B, and others, and an output side of the ECU 41 is connected to the damping-force variable actuator 7 of the variable damper 6 and others. The ECU 41 includes a processor serving as a control unit and a storage unit including a ROM, a RAM, a non-volatile memory, and the like (none are shown). The processor executes a program stored in the storage unit, to thereby control the damping force of the variable damper 6.

The ECU 41 reads the vehicle driving information from the CAN 8 via serial communication. The ECU 41 reads a sprung acceleration sensor value (sprung acceleration) via the detection signal from each of the sprung acceleration sensors 9A to 9C. The ECU 41 reads an unsprung acceleration sensor value (unsprung acceleration) via the detection signal from each of the unsprung acceleration sensors 10A and 10B. The ECU 41 calculates a target damping force and others based on the vehicle driving information, the sprung acceleration, and the unsprung acceleration. The ECU 41 outputs a control command based on the target damping force to the variable damper 6 to control the generated force (damping force) of the variable damper 6.

The ECU 41 forms a sensor abnormality detection device for detecting abnormality of the sprung acceleration sensors 9A to 9C and the unsprung acceleration sensors 10A and 10B. The ECU 41 is configured substantially the same way as the ECU 21 according to the first embodiment. Thus, the ECU 41 includes the CAN input unit 22, the sprung acceleration input units 23A to 23C, and the unsprung acceleration input units 24A and 24B.

The ECU 41 executes a program stored in the storage unit, to thereby detect abnormality of the sprung acceleration sensors 9A to 9C and the unsprung acceleration sensors 10A and 10B. The ECU 41 acquires the vehicle speed included in the vehicle driving information from the CAN 8. The ECU 41 acquires, based on three detection signals from the sprung acceleration sensors 9A to 9C, sprung acceleration sensor values (sprung acceleration) of the respective sensors. The ECU 41 acquires, based on two detection signals from the unsprung acceleration sensors 10A and 10B, unsprung acceleration sensor values (unsprung acceleration) of the respective sensors.

The ECU 41 includes a model estimation value calculation unit 42 which estimates vehicle behavior from vehicle model information to obtain a vehicle behavior estimation value, and a comparative determination unit 43 which compares a sprung acceleration estimation value included in the vehicle behavior estimation value to three sprung acceleration sensor values.

The model estimation value calculation unit 42 uses, for example, a quarter vehicle model of a single wheel to estimate sprung acceleration based on unsprung acceleration of each wheel and road surface inputs. In this case, the ECU 41 acquires unsprung acceleration of the front wheels based on, for example, the detection signals of the unsprung acceleration sensors 10A and 10B. The ECU 41 acquires unsprung acceleration of the rear wheels based on, for example, the detection signals of the unsprung acceleration sensors 10A and 10B and the vehicle speed. The ECU 41 acquires road surface inputs based on, for example, the vehicle driving information from the CAN 8.

The model estimation value calculation unit 42 uses, for example, a quarter vehicle model of a single wheel to estimate unsprung acceleration based on sprung acceleration of each wheel and road surface inputs. The vehicle model to be used is not limited to a quarter vehicle model, and may be a two-wheeled model of a pair of a right wheel and a left wheel or a pair of a front wheel and a rear wheel, or may be a four-wheeled vehicle model.

The comparative determination unit 43 acquires the vibration level of the sprung acceleration sensor value of each of the sprung acceleration sensors 9A to 9C, based on a maximum peak value and a minimum peak value (peak-to-peak value) of the sprung acceleration sensor value. The comparative determination unit 43 calculates a difference between the vibration level of the sprung acceleration sensor value of each of the sprung acceleration sensors 9A to 9C and a vibration level based on a sprung acceleration estimation value of the model estimation value calculation unit 42. When a state in which an absolute value of one of those differences in vibration level is equal to or more than a predetermined value lasts for a certain length of time, the comparative determination unit 43 determines that the corresponding sprung acceleration sensor value is abnormal.

Thus, when, for example, a difference between the sprung acceleration sensor value of the sprung acceleration sensor 9A and the sprung acceleration estimation value estimated by the model estimation value calculation unit 42 is large despite the vibration levels of the sprung acceleration sensor values of the sprung acceleration sensors 9B and 9C exceeding the first fluctuation range R11 (a constant value), the comparative determination unit 43 determines that the sprung acceleration sensor value of the sprung acceleration sensor 9A is stuck. The comparative determination unit 43 also determines that, for example, the sprung acceleration sensor value of the sprung acceleration sensor 9A is vibrating abnormally when a difference between the sprung acceleration sensor value of the sprung acceleration sensor 9A and the sprung acceleration estimation value estimated by the model estimation value calculation unit 42 is large despite the vibration levels of the sprung acceleration sensor values of the sprung acceleration sensors 9B and 9C being less than the second fluctuation range R21 (a constant value).

In this case, the predetermined value used to determine whether a vibration level is appropriate is suitably set to a value that takes a margin for a noise and the like into consideration, with a vibration level based on the sprung acceleration estimation value of the model estimation value calculation unit 42 as a reference. Specifically, the predetermined value is set to a value that is approximately ⅓ of the vibration level based on the sprung acceleration estimation value. The certain length of time used to determine whether a vibration level is appropriate is suitably set based on an experiment using an actual vehicle or the like, by taking an effect of reducing erroneous detection and the like into consideration.

In addition thereto, the ECU 41 includes a comparative determination unit 44 which compares an unsprung acceleration estimation value included in the vehicle behavior estimation value to two unsprung acceleration sensor values. The comparative determination unit 44 acquires the vibration level of the unsprung acceleration sensor value of each of the unsprung acceleration sensors 10A and 10B, based on a maximum peak value and a minimum peak value (peak-to-peak value) of the unsprung acceleration sensor value. The comparative determination unit 44 calculates a difference between the vibration level of the unsprung acceleration sensor value of each of the unsprung acceleration sensors 10A and 10B and a vibration level based on the unsprung acceleration estimation value of the model estimation value calculation unit 42. When a state in which an absolute value of one of those differences in vibration level is equal to or more than a predetermined value lasts for a certain length of time, the comparative determination unit 44 determines that the corresponding unsprung acceleration sensor value is abnormal.

Thus, when, for example, a difference between the unsprung acceleration sensor value of the unsprung acceleration sensor 10A and the unsprung acceleration estimation value estimated by the model estimation value calculation unit 42 is large despite the vibration level of the unsprung acceleration sensor value of the unsprung acceleration sensor 10B exceeding the first fluctuation range R12 (a constant value), the comparative determination unit 44 determines that the unsprung acceleration sensor value of the unsprung acceleration sensor 10A is stuck. The comparative determination unit 44 also determines that, for example, the unsprung acceleration sensor value of the unsprung acceleration sensor 10A is vibrating abnormally when the difference between the unsprung acceleration sensor value of the unsprung acceleration sensor 10A and the unsprung acceleration estimation value estimated by the model estimation value calculation unit 42 is large despite the vibration level of the unsprung acceleration sensor values of the unsprung acceleration sensor 10B being less than the second fluctuation range R22 (a constant value).

The ECU 41 according to the third embodiment has the configuration described above. Next, the sensor abnormality detection by the ECU 41 is described with reference to FIG. 8 and FIG. 9 by taking, as an example, operation executed when abnormality of one of the sprung acceleration sensors is detected.

Figure 8:
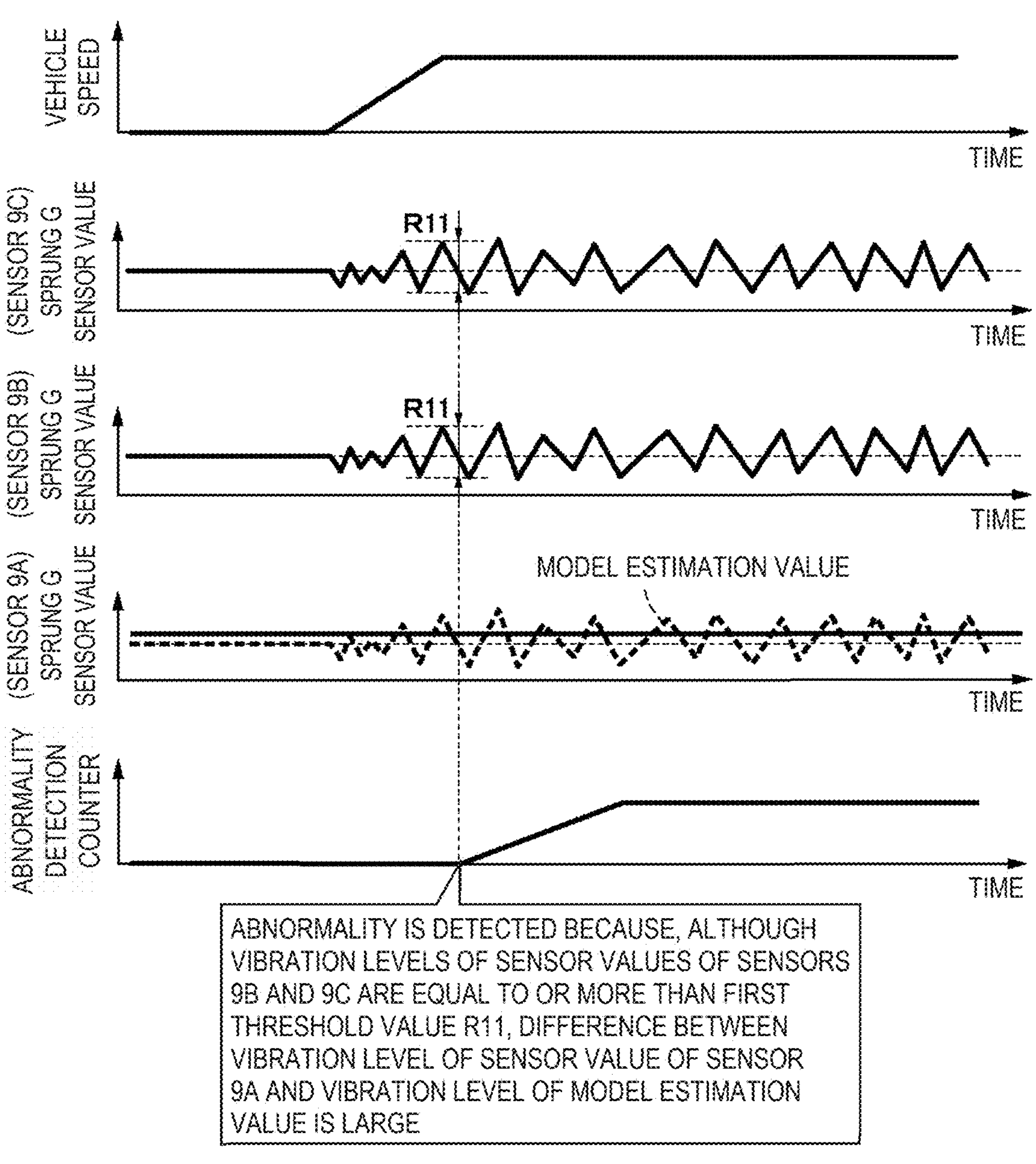
FIG. 8 is a characteristic chart for showing an example of temporal changes in vehicle speed, sprung acceleration sensor value, and count of the abnormality detection counter in a case in which a vibration level of the sprung acceleration sensor value exceeds a first fluctuation range.

As shown in FIG. 8, when the vibration level of the sprung acceleration sensor value of one of the sprung acceleration sensors (for example, the sprung acceleration sensors 9B and 9C) exceeds the first fluctuation range R11, the ECU 41 calculates a difference between the vibration level of the sprung acceleration sensor value of each of the sprung acceleration sensors 9A to 9C and a vibration level of a sprung acceleration estimation value estimated by the model estimation value calculation unit 42. In this case, when a state in which an absolute value of the difference in vibration level is equal to or more than a predetermined value lasts for a certain length of time, the ECU 41 determines that the sprung acceleration sensor (for example, the sprung acceleration sensor 9A) corresponding to that sprung acceleration sensor value is stuck, and increments the count of the abnormality detection counter. When the count of the abnormality detection counter reaches a predetermined value, the ECU 41 outputs an error signal and notifies that there is abnormality in the sprung acceleration sensor of interest.

Figure 9:
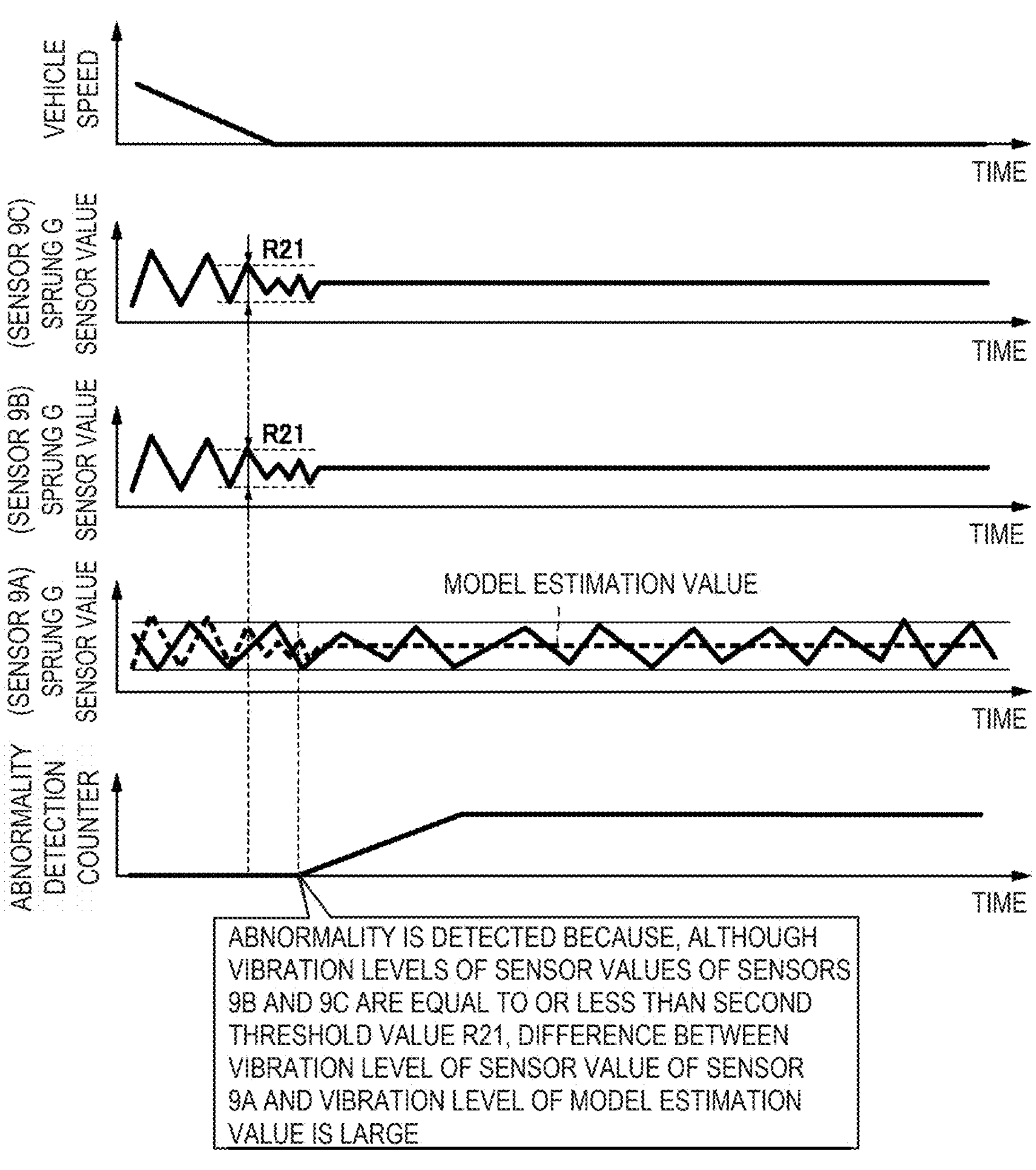
FIG. 9 is a characteristic chart for showing an example of temporal changes in vehicle speed, sprung acceleration sensor value, and count of the abnormality detection counter in a case in which the vibration level of the sprung acceleration sensor value is smaller than a second fluctuation range.

As shown in FIG. 9, when the vibration level of the sprung acceleration sensor value of one of the sprung acceleration sensors (for example, the sprung acceleration sensors 9B and 9C) is less than the second fluctuation range R21, the ECU 41 calculates a difference between the vibration level of the sprung acceleration sensor value of each of the sprung acceleration sensors 9A to 9C and the vibration level of the sprung acceleration estimation value estimated by the model estimation value calculation unit 42. In this case, when a state in which the absolute value of the difference in vibration level is equal to or more than a predetermined value lasts for a certain length of time, the ECU 41 determines that the sprung acceleration sensor value of the sprung acceleration sensor (for example, the sprung acceleration sensor 9A) corresponding to that sprung acceleration sensor value is vibrating abnormally, and increments the count of the abnormality detection counter, When the count of the abnormality detection counter reaches a predetermined value, the ECU 41 outputs an error signal and notifies that there is abnormality in the sprung acceleration sensor of interest.

In this manner, the same actions and effects as those of the first embodiment can be obtained in the thus configured third embodiment as well. The ECU 41 according to the third embodiment can determine that, when the vibration level of the sprung acceleration sensor value of one of the sprung acceleration sensors (for example, the sprung acceleration sensors 9B and 9C) exceeds a certain value, and yet a difference between output of another sprung acceleration sensor (for example, the sprung acceleration sensor 9A) and output of the model estimation value calculation unit 42 is large, the corresponding sprung acceleration sensor value is stuck.

The ECU 41 can also determine that, when the vibration level of the sprung acceleration sensor value of one of the sprung acceleration sensors (for example, the sprung acceleration sensors 9B and 9C) is very small, and yet a difference between output of another sprung acceleration sensor (for example, the sprung acceleration sensor 9A) and output of the model estimation value calculation unit 42 is large, the corresponding sprung acceleration sensor value is vibrating abnormally.

The ECU 41 can also determine that, when the vibration level of the unsprung acceleration sensor value of one of the unsprung acceleration sensors (for example, the unsprung acceleration sensor 10B) exceeds a certain value, and yet a difference between output of another unsprung acceleration sensor (for example, the unsprung acceleration sensor 10A) and output of the model estimation value calculation unit 42 is large, the corresponding unsprung acceleration sensor value is stuck.

The ECU 41 can also determine that, when the vibration level of the unsprung acceleration sensor value of one of the unsprung acceleration sensors (for example, the unsprung acceleration sensor 10B) is very small, and yet a difference between output of another unsprung acceleration sensor (for example, the unsprung acceleration sensor 10A) and output of the model estimation value calculation unit 42 is large, the corresponding unsprung acceleration sensor value is vibrating abnormally.

The comparative determination unit 43 in the third embodiment determines whether a difference between output of each of the sprung acceleration sensors 9A to 9C and output of the model estimation value calculation unit 42 is large irrespective of the vehicle speed, but the present invention is not limited thereto. Similarly to the first determination unit 25 in the first embodiment and the second determination unit 32 in the second embodiment, the comparative determination unit 43 may be designed so as to determine, whether a difference between output of each of the sprung acceleration sensors 9A to 9C and output of the model estimation value calculation unit 42 is large when the vehicle speed satisfies a certain condition. This applies to the comparative determination unit 44 in the third embodiment as well.

The third embodiment may be combined with the first and second embodiments. That is, the ECU 41 may include, in addition to the model estimation value calculation unit 42 and the comparative determination units 43 and 44, the first determination units 25 and 26 in the first embodiment and the second determination units 32 and 33 in the second embodiment.

The embodiments described above take the ECUs 21, 31, and 41 which detect abnormality of the sprung acceleration sensors 9A to 9C and the unsprung acceleration sensors 10A and 10B as an example, but the present invention is not limited thereto. It is sufficient for an ECU to detect abnormality of at least two sensors installed in a vehicle, and the targets of abnormality detection by the ECU may be, for example, various acceleration sensors, a vehicle height sensor, and a gyroscope sensor. Further, the ECUs 21, 31, and 41 control the variable damper 6, but the present invention is not limited thereto. An ECU that detects abnormality of various sensors may be included separately from an ECU that controls a variable damper.

The embodiments described above take a case in which the vehicle speed is transmitted via a CAN signal and the traveling speed input unit is the CAN input unit 22 as an example, but the present invention is not limited thereto. In a case in which a wheel speed sensor is connected directly to an ECU, for example, the traveling speed input unit may be a wheel speed input unit to which a wheel speed is to be input from the wheel speed sensor.

The embodiments described above take a case in which the variable damper 6 which is a force generating mechanism forms a semi-active suspension as an example. The present invention is not limited thereto, and the force generating mechanism may form an active suspension that generates a force in a vertical direction between the vehicle body and the wheel. Specifically, an actuator is formed of an electric actuator, a hydraulic actuator, or the like that generates a force in an extending direction or a contracting direction between the vehicle body and the wheel.

The embodiments described above take a case in which the actuator (force generating mechanism) which generates an adjustable force between the vehicle body 1 and the wheel 2 is formed of the variable damper 6 of a damping-force adjustment type as an example. The present invention is not limited to thereto, and for example, as an alternative to the hydraulic shock absorber, the actuator may be formed of, for example, an air suspension, a stabilizer (kinematic suspension), or an electromagnetic suspension.

The embodiments described above take a case of a suspension system to be used for a four-wheeled vehicle as an example. The present invention is not limited to thereto, and may be applicable also to, for example, a two-wheeled vehicle, a three-wheeled vehicle, or a truck or a bus which is a working vehicle or a transport vehicle.

The embodiments described above are examples, and partial replacement or combination of the configurations presented in different embodiments can be made.

The present invention is not limited to the embodiments described above, and includes further various modification examples. For example, in the embodiments described above, the configurations are described in detail in order to clearly describe the present invention, but the present invention is not necessarily limited to an embodiment that includes all the configurations that have been described. Further, a part of the configuration of a given embodiment can be replaced by the configuration of another embodiment, and the configuration of another embodiment can also be added to the configuration of a given embodiment. Further, another configuration can be added to, deleted from, or replace a part of the configuration of each of the embodiments.

The present application claims a priority based on Japanese Patent Application No. 2022-199480 filed on Dec. 14, 2022. All disclosed contents including Specification, Scope of Claims, Drawings, and Abstract of Japanese Patent Application No. 2022-199480 filed on Dec. 14, 2022 are incorporated herein by reference in their entirety.

REFERENCE SIGNS LIST

1: vehicle body, 2: wheel, 4: suspension device, 6: variable damper (damping-force adjustment-type shock absorber, force generating mechanism), 7: damping-force variable actuator, 8: CAN, 9A to 9C: sprung acceleration sensor, 10A, 10B: unsprung acceleration sensor, 21, 31, 41: ECU (sensor abnormality detection device), 22: CAN input unit (traveling speed input unit), 23A to 23C: sprung acceleration input unit (first sensor input unit, second sensor input unit), 24A, 24B: unsprung acceleration input unit (first sensor input unit, second sensor input unit), 25, 26: first determination unit, 32, 33: second determination unit, 42: model estimation value calculation unit, 43, 44: comparative determination unit, V11, V12: first threshold value (first speed), V21, V22: second threshold value (second speed), R11, R12: first fluctuation range, R21, R22: second fluctuation range

The invention claimed is:

1. A sensor abnormality detection device for detecting abnormality of at least three sensors provided in a vehicle, the sensor abnormality detection device comprising:

a traveling speed input unit to which a traveling speed of the vehicle is to be input;

a first sensor input unit to which a signal fluctuation range of a first sensor is to be input;

a second sensor input unit to which a signal fluctuation range of a second sensor is to be input; and a first determination unit configured to, when the traveling speed provided by the traveling speed input unit is equal to or more than a first speed, and when a signal fluctuation range of one of a first sensor input value of the first sensor input unit and a second sensor input value of the second sensor input unit is larger than a first fluctuation range or is larger than the other signal fluctuation range, compare the signal fluctuation range of a remaining sensor input value of the remaining sensor input unit with the signal fluctuation range of the one.

2. The sensor abnormality detection device according to claim 1, further comprising a second determination unit configured to determine whether the traveling speed provided by the traveling speed input unit is equal to or less than a second speed, and the signal fluctuation range of one of the first sensor input value of the first sensor input unit and the second sensor input value of the second sensor input unit is larger than a second fluctuation range and larger than the signal fluctuation range of another of the first sensor input value and the second sensor input value.

3. The sensor abnormality detection device according to claim 1, further comprising:

a model estimation value calculation unit configured to estimate vehicle behavior from vehicle model information to obtain a vehicle behavior estimation value; and a comparative determination unit configured to compare the vehicle behavior estimation value to the first sensor input value or the second sensor input value.

* * * * *